(12) United States Patent
Jung et al.

(10) Patent No.: US 10,467,413 B2
(45) Date of Patent: Nov. 5, 2019

(54) METHOD AND APPARATUS OF DYNAMIC LOADING FILE EXTRACTION FOR AN APPLICATION RUNNING IN AN ANDROID CONTAINER

(71) Applicant: Foundation of Soongsil University-Industry Cooperation, Seoul (KR)

(72) Inventors: Souhwan Jung, Seoul (KR); Jungsoo Park, Seoul (KR); Seongeun Kang, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 187 days.

(21) Appl. No.: 15/866,059

(22) Filed: Jan. 9, 2018

(65) Prior Publication Data

US 2019/0121980 A1   Apr. 25, 2019

(30) Foreign Application Priority Data

Oct. 23, 2017   (KR) ................. 10-2017-0137213

(51) Int. Cl.
  *G06F 21/00* (2013.01)
  *G06F 21/56* (2013.01)
  *G06F 9/445* (2018.01)

(52) U.S. Cl.
  CPC ........ *G06F 21/566* (2013.01); *G06F 9/44521* (2013.01); *G06F 21/568* (2013.01); *G06F 2221/033* (2013.01)

(58) Field of Classification Search
  CPC ................. G06F 21/566; G06F 21/568; G06F 2221/1033; G06F 9/44521
  See application file for complete search history.

(56) References Cited

U.S. PATENT DOCUMENTS

| | | | |
|---|---|---|---|
| 2006/0041594 A1* | 2/2006 | Chang | G06F 16/10 |
| 2007/0299884 A1* | 12/2007 | Komori | G06F 3/0605 |
| 2012/0030261 A1* | 2/2012 | Mason, Jr. | G06F 16/1873 707/822 |
| 2014/0074802 A1* | 3/2014 | Blount | G06F 16/162 707/692 |

(Continued)

FOREIGN PATENT DOCUMENTS

| | | |
|---|---|---|
| KR | 10-2009-0119481 A | 11/2009 |
| KR | 10-1161493 B1 | 6/2012 |

(Continued)

*Primary Examiner* — Beemnet W Dada
(74) *Attorney, Agent, or Firm* — Novick, Kim & Lee, PLLC; Sang Ho Lee

(57) ABSTRACT

Provided is a method and apparatus of dynamic loading file extraction. The method for extracting a specific dynamic generated file of an application running in an Android container environment includes conducting first analysis to identify if a file extension that is stored in the Android container corresponds to a preset critical extension, to extract a file with the critical extension, and conducting second analysis to identify a deleted file standing for a file deleted after stored in the Android container, and running the application again and extracting the deleted file based on a result of the second analysis.

15 Claims, 3 Drawing Sheets

(56) References Cited

U.S. PATENT DOCUMENTS

| | | | |
|---|---|---|---|
| 2014/0156943 A1* | 6/2014 | Sato | G06F 12/0891 |
| | | | 711/135 |
| 2014/0168095 A1* | 6/2014 | Mesguich Havilio | ...... |
| | | | G06F 3/04883 |
| | | | 345/173 |
| 2017/0068470 A1* | 3/2017 | Ravimohan | G06F 12/0246 |
| 2019/0095455 A1* | 3/2019 | Barreto | G06F 16/128 |

FOREIGN PATENT DOCUMENTS

| | | |
|---|---|---|
| KR | 10-1295644 B1 | 9/2013 |
| KR | 10-2014-0121743 A | 10/2014 |
| KR | 10-1476222 B1 | 12/2014 |
| KR | 10-1623508 B1 | 5/2016 |
| KR | 10-1628837 B1 | 6/2016 |
| KR | 10-2017-0096451 A | 8/2017 |

* cited by examiner

METHOD AND APPARATUS OF DYNAMIC LOADING FILE EXTRACTION FOR AN APPLICATION RUNNING IN AN ANDROID CONTAINER

CROSS-REFERENCE TO RELATED APPLICATIONS

This application claims priority under 35 U.S.C. § 119 to Korean Patent Application No. 10-2017-0137213, filed on Oct. 23, 2017, in the Korean Intellectual Property Office, the disclosure of which is incorporated herein by reference in its entirety.

TECHNICAL FIELD

The present disclosure relates to a method and apparatus of dynamic loading file extraction of dynamic loading file extraction, and more particularly, to a method and apparatus of dynamic loading file extraction for an application running in an android container.

BACKGROUND

Recently, Android's malicious applications have become more sophisticated to bypass the existing analyses. For example, there are malicious applications to which dynamic loading mechanism is applied to hide the malicious code. In the case that dynamic loading mechanism is applied to a malicious application, malicious activity is done through a dynamic generated file after the application runs. To this end, encryption of DEX file, jar file and APK file, or deletion of a dynamic generated file immediately after downloading from a C&C server is applied to the malicious application. When analyzing the malicious application to which dynamic loading mechanism is applied, extracting a file used in dynamic loading is an important factor.

However, if all the generated files of the application are extracted to extract a file used in dynamic loading, many files including unnecessary files for actual analysis such as cache file and data storage file are extracted, so mechanism for extracting only necessary file for actual analysis is needed. Moreover, in some instances, as described above, a certain file used in dynamic loading is deleted after the dynamic loading is processed, which impedes the analysis operation. Thus, an approach using network analysis was previously proposed, but it is difficult to acquire proper information, making it difficult to see what file has leaked.

SUMMARY

An aspect of the present disclosure provides a method of dynamic loading file extraction that extracts a file with critical extension necessary for actual analysis and a file that is deleted after dynamic loading.

Another aspect of the present disclosure provides an apparatus of dynamic loading file extraction that performs file extraction by conducting first analysis to carry out extension comparison of a generated file of an application and second analysis to identify a deleted file after dynamic loading. According to one aspect of the present embodiment, a method of dynamic loading file extraction for an application running in an Android container is provided. The method includes conducting a first analysis to determine whether a file has a file extension and is stored in the Android container and the file extension of the file corresponds to any of a predetermined group of file extensions and to extract the file having the file extension which corresponds to any of the predetermined group of file extensions; and conducting a second analysis to identify a deleted file which is stored in the Android container and deleted; and re-executing the application and extracting the deleted file based on a result of the second analysis.

The method of dynamic loading file extraction further includes monitoring the Android container to identify a file name and a storage path of any file that is stored in the Android container when the application runs.

The method of dynamic loading file extraction further includes storing the extracted file in a separate path.

The predetermined group of file extensions includes DEX, jar, zip, APK and SO.

The second analysis includes identifying if a deletion log is present in a memory log provided in a Linux host on which the Android container runs, and when there is the deletion log, identifying a file name and a storage path of the deleted file from the deletion log.

The step of rerunning the application and the step of extracting the deleted file include re-executing the application and extracting the deleted file when the deleted file is present as a result of the second analysis.

The step of the re-executing the application and the step of the extracting the deleted file further include terminating file extraction when the deleted file is absent as a result of the second analysis.

The method of dynamic loading file extraction further includes identifying a file name and a storage path of the deleted file by conducting the second analysis, and while the application re-executes, extracting the deleted file at the moment when the deleted file is being stored in the storage path of the deleted file.

According to another aspect of the present embodiments, an apparatus of dynamic loading file extraction for an application running in an Android container is provided. The apparatus includes a processor and a memory; a first extracting unit conducting a first analysis to determine whether a file has a file extension and is stored in the Android container and the file extension of the file corresponds to a predetermined group of file extensions and to extract the file having the file extension which corresponds to any of the predetermined group of file extensions; and a second extracting unit conducting a second analysis to identify a deleted file which is stored in the Android container and deleted, to re-execute the application and to extract the deleted file based on a result of the second analysis.

The apparatus of dynamic loading file extraction further includes a monitoring unit monitoring the Android container to identify a file name and a storage path of any file that is stored in the Android container when the application runs.

The apparatus of dynamic loading file extraction further includes a file storing unit storing the file extracted by the first extracting unit and the second extracting unit in a separate path.

The predetermined group of file extensions includes DEX, jar, zip, APK and SO.

The second extracting unit identifies if a deletion log is present in a memory log provided in a Linux host on which the Android container runs, and when there is the deletion log, and identifies a file name and a storage path of the deleted from the deletion log.

The second extracting unit re-executes the application and extracts the deleted file when the deleted file is present as a result of the second analysis, and terminates file extraction when the deleted file is absent as a result of the second analysis.

The second extracting unit identifies a file name and a storage path of the deleted file by conducting the second analysis, and while the application re-executes, extracts the deleted file at the moment when the deleted file is being stored in the storage path of the deleted file Effects of the Invention According to an aspect of the present disclosure described above, only the file necessary for actual analysis of a malicious application can be extracted, increasing the efficiency of analysis, and also will allow additional analysis of a file that is deleted after dynamic loading.

According to another aspect of the present disclosure described above, malicious applications made with an intention to steal certain information can be identified by distinguishing a file with critical extension and a file that is deleted after dynamic loading, thereby deriving more accurate application analysis results.

DETAILED DESCRIPTION OF EMBODIMENTS

Figure 1:
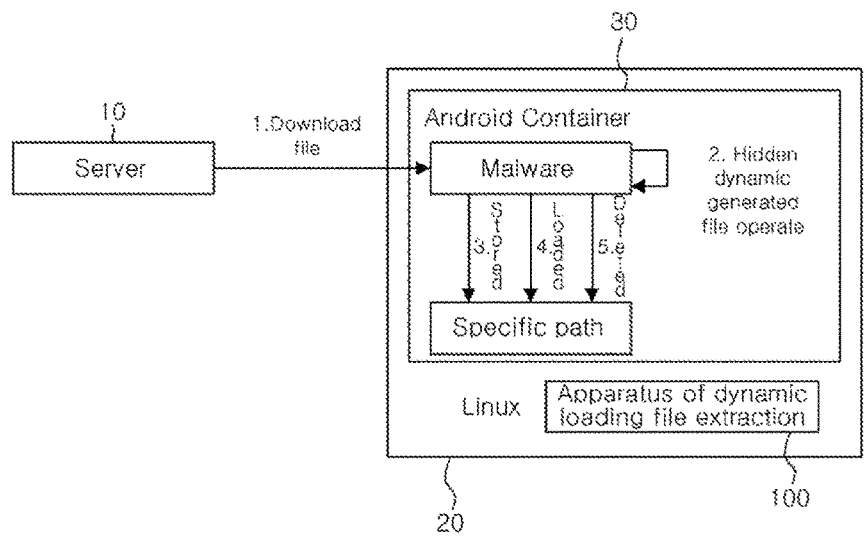
FIG. 1 is a conceptual diagram of an application analysis system including an apparatus of dynamic loading file extraction according to an embodiment of the present disclosure.

These and other advantages and features of the present disclosure and methods for achieving them will be apparent from the following detailed description in conjunction with the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims. Like reference numerals indicate like elements throughout the specification.

The terminology used herein is only for the purpose of describing the embodiments and is not intended to be limiting of the present disclosure. As used herein, the singular forms are intended to include the plural forms as well, unless the context clearly indicates otherwise. The term "comprises" and/or "comprising" when used in this specification specify the presence of stated elements, steps and operations, but do not preclude the presence or addition of one or more other elements, steps and operations.

The term "unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

FIG. 1 is a conceptual diagram of an application analysis system including an apparatus of dynamic loading file extraction according to an embodiment of the present disclosure.

Referring to FIG. 1, the application analysis system 1000 may include a server 10, a Linux host 20, an Android container 30, and an apparatus 100 for extracting a specific dynamic generated file.

The application analysis system 1000 may run the Android container 30 on the Linux host 20 by applying container technology. The container technology is technology to provide an isolated virtual space of operating system level using namespace and control groups (cgroups). The application analysis system 1000 may run the Android container 30 on the Linux host 20 to create the Android container 30, an environment for application analysis.

The application analysis system 1000 may download an executable file of a target application for analysis from the server 10, and run the executable file on the Android container 30. A malicious application may include a dynamic generated file that does malicious activity after it is loaded when the application runs. Thus, when a malicious application runs on the Android container 30, a dynamic generated file may be stored and loaded at a specific path and conduct malicious activity. Moreover, the dynamic generated file stored in the specific path may be deleted after it is loaded.

The apparatus 100 of dynamic loading file extraction extracting a specific dynamic generated file according to an embodiment of the present disclosure is included in the application analysis system 1000, to extract a dynamic generated file used in malicious activity of an application running on the Android container 30. The application analysis system 1000 may derive more accurate application analysis results by analyzing the dynamic generated file extracted by the apparatus 100 of dynamic loading file extraction.

Hereinafter, the operation of extracting a dynamic generated file by the apparatus 100 of dynamic loading file extraction in the application analysis system 1000 will be described.

Figure 2:
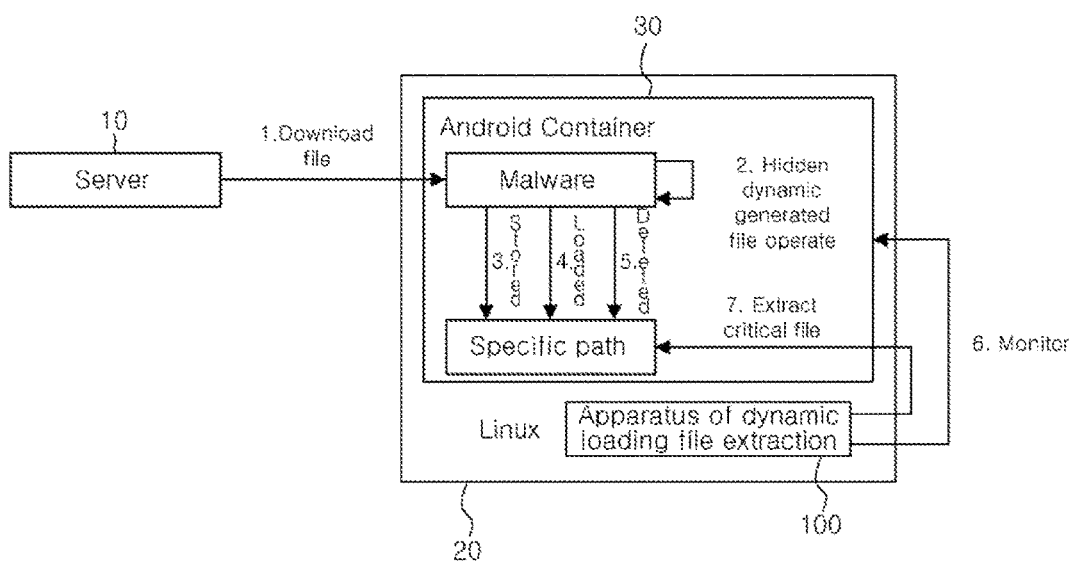
FIGS. 2 and 3 are diagrams illustrating the operation of an apparatus of dynamic loading file extraction according to an embodiment of the present disclosure.
Figure 3:
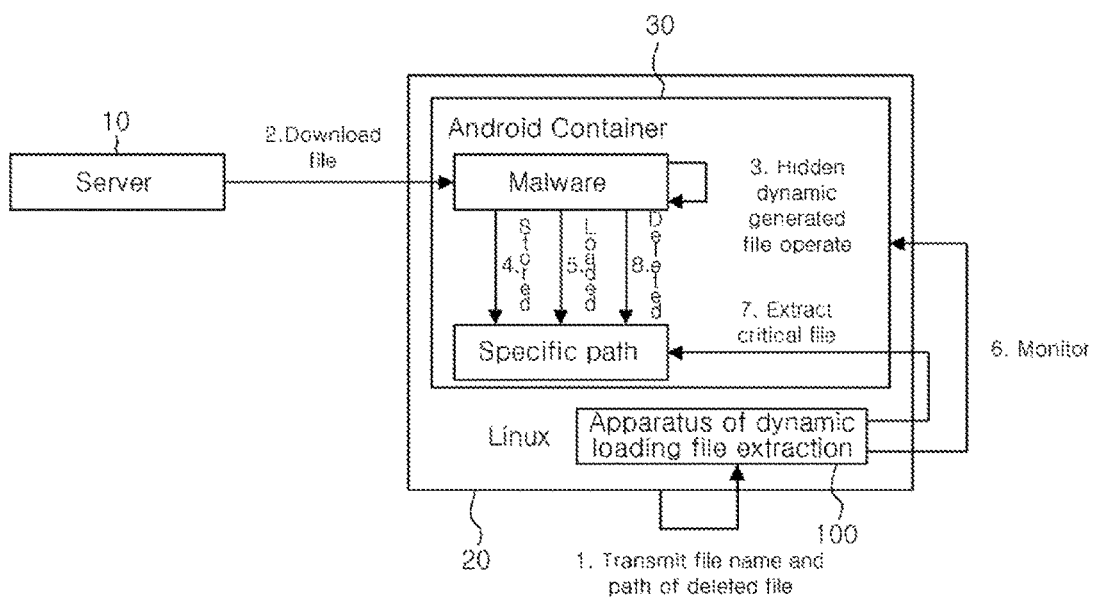

FIGS. 2 and 3 are diagrams illustrating the operation of the apparatus of dynamic loading file extraction according to an embodiment of the present disclosure.

The apparatus 100 of dynamic loading file extraction according to an embodiment of the present disclosure may extract a dynamic generated file by two methods. First, the apparatus 100 of dynamic loading file extraction may extract a dynamic generated file through extension comparison of a file that is stored in a specific path of the Android container 30. Furthermore, the apparatus 100 of dynamic loading file extraction may identify a file that is deleted after stored in the Android container 30, and extract the corresponding file as a dynamic generated file.

Specifically, referring to FIG. 2, the apparatus 100 of dynamic loading file extraction may monitor a file that is stored in a specific path when an application runs on the Android container 30. The apparatus 100 of dynamic loading file extraction may extract a file with a preset critical extension as a dynamic generated file, from the files stored in the specific path of the Android container 30.

Referring to FIG. 3, the apparatus 100 of dynamic loading file extraction may acquire the file name and storage path information of a deleted file standing for a file deleted after stored in the Android container 30, from the Linux host 20. The apparatus 100 of dynamic loading file extraction may run the application on the Android container 30 again. When the application runs on the Android container 30 again, the apparatus 100 of dynamic loading file extraction may monitor a file that is stored in a specific path. The apparatus 100 of dynamic loading file extraction may extract a deleted file as a dynamic generated file at the moment when the corresponding deleted file is stored in the specific path of the Android container 30, based on the information acquired from the Linux host 20.

Hereinafter, the apparatus 100 of dynamic loading file extraction according to an embodiment of the present disclosure will be described in detail with reference to FIG. 4.

Figure 4:
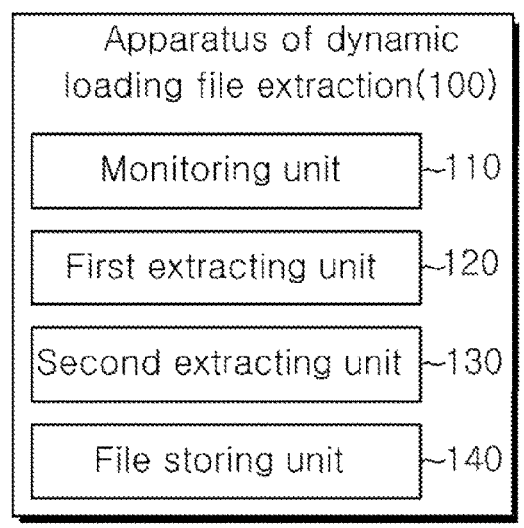
FIG. 4 is a control block diagram of an apparatus of dynamic loading file extraction according to an embodiment of the present disclosure.

FIG. 4 is a control block diagram of the apparatus 100 of dynamic loading file extraction according to an embodiment of the present disclosure.

Referring to FIG. 4, the apparatus 100 of dynamic loading file extraction may include a monitoring unit 110, a first extracting unit 120, a second extracting unit 130, and a file storing unit 140. As shown in FIG. 1, the apparatus 100 of dynamic loading file extraction is included in the application analysis system 1000, and may extract a dynamic generated file of an application running in a Linux host-based Android container environment.

When an application runs on the Android container 30, the monitoring unit 110 may perform monitoring of the Android container 30. The monitoring unit 110 may monitor the file name and storage path of a file that is stored in the Android container 30.

The first extracting unit 120 may conduct first analysis to carry out extension comparison of a file that is stored in the Android container 30, and may extract the file based on the results.

Specifically, the first extracting unit 120 may identify, through the monitoring unit 110, a file extension that is stored in a specific path of the Android container 30 when the application runs. The first extracting unit 120 may conduct first analysis by comparison to determine if the extension of the file that is stored in the specific path of the Android container 30 corresponds to a preset critical extension. Here, the critical extension may be set as DEX, jar, zip, APK and SO. When dynamic loading mechanism is applied to a malicious application, an executable file such as DEX file, jar file and APK file is encrypted to generate a new file through commands. Accordingly, the first extracting unit 120 may only extract an executable file with one of the critical extensions DEX, jar, zip, APK and SO required to actually analyze, from a plurality of executable files of the application.

The second extracting unit 130 may conduct second analysis to identify a file that is deleted after stored in the Android container 30, and according to the results, may run the application again and extract the file.

Specifically, the second extracting unit 130 may identify if there is a file that is deleted after stored in the Android container 30, by identifying if a deletion log has generated in the memory log provided in the Linux host 20 on which the Android container 30 runs. When a deletion log is present in the memory log of the Linux host 20, the second extracting unit 130 may identify the file name of a file corresponding to the corresponding deletion log and a path in which the corresponding file is stored. As described above, the second extracting unit 130 may conduct second analysis to identify the file name and storage path of a deleted file standing for a file deleted after stored in the Android container 30 when the application runs.

As a result of the second analysis, when it is identified that there is a deletion file standing for a file deleted after stored in the Android container 30, the second extracting unit 130 may re-download the application from the server 10 and run it on the Android container 30. When the application runs on the Android container 30 again, the second extracting unit 130 may identify if a file with the file name of the corresponding deleted file is stored in the storage path of the deleted file identified from second analysis through the monitoring unit 110. The second extracting unit 130 may extract a deleted file at the moment when the corresponding file is stored in the Android container 30. When dynamic loading mechanism is applied to a malicious application, in some instance, a file used in dynamic loading is deleted immediately after the file is downloaded from a C&C server to hide the malicious code. The second extracting unit 130 may extract a deleted file standing for a file used in dynamic loading of the malicious application and immediately deleted.

As a result of the second analysis, when a deleted file standing for a file deleted after stored in the Android container 30 is identified to be absent, the second extracting unit 130 may terminate the file extraction.

The file storing unit 140 may store the file extracted by the first extracting unit 120 and the second extracting unit 130 in a separate path. The file storing unit 140 may store the file with critical extension extracted by the first extracting unit 120 in a separate path. The file storing unit 140 may store the deleted file extracted by the second extracting unit 130 in a separate path. The file storing unit 140 may store the file extracted by the first extracting unit 120 and the second extracting unit 130, for example, in the SD card area of the Linux host 20.

Hereinafter, a method for extracting a specific dynamic generated file according to an embodiment of the present disclosure will be described. The method for extracting a specific dynamic generated file according to an embodiment of the present disclosure may be performed substantially in the same configuration as the apparatus 100 of dynamic loading file extraction shown in FIG. 1. Accordingly, the same elements as the apparatus 100 of dynamic loading file extraction of FIG. 1 are given the same reference numerals, and a repeated description is omitted herein.

Figure 5:
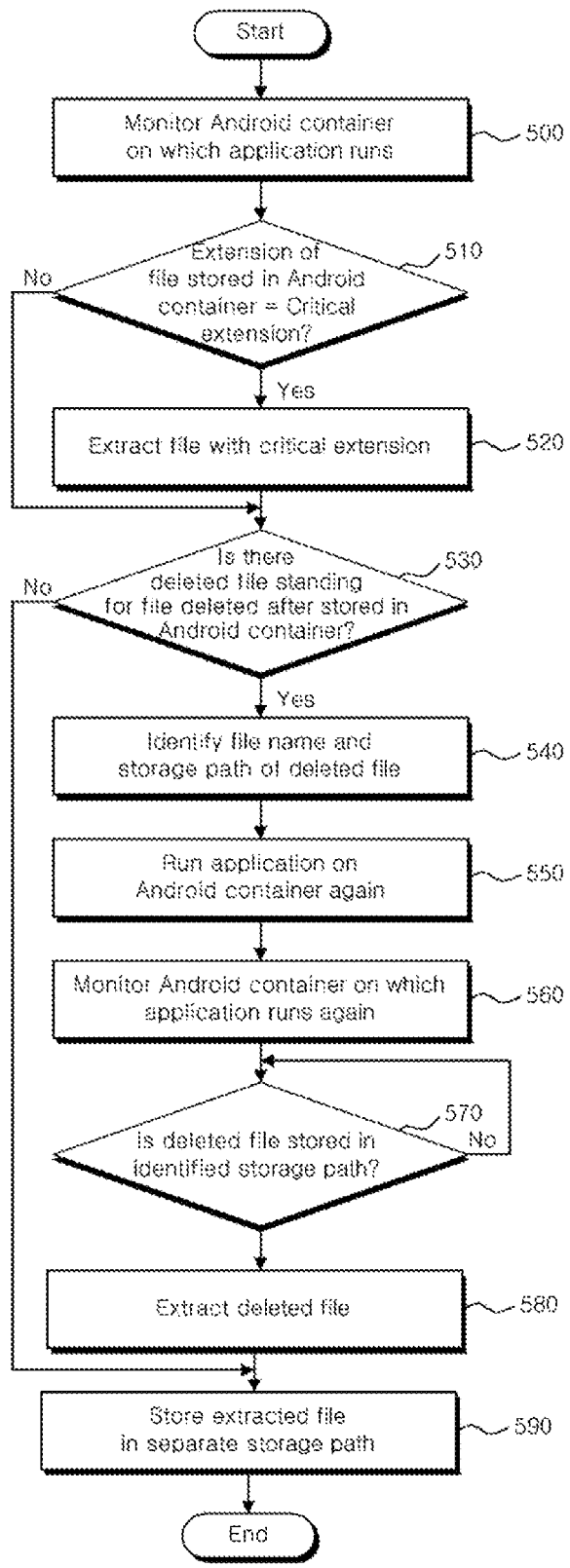
FIG. 5 is a flowchart of a method for extracting a specific dynamic generated file in an apparatus of dynamic loading file extraction according to an embodiment of the present disclosure.

FIG. 5 is a flowchart of the method for extracting a specific dynamic generated file according to an embodiment of the present disclosure.

Referring to FIG. 5, the apparatus 100 of dynamic loading file extraction may monitor the Android container 30 on which an application runs (500). The apparatus 100 of dynamic loading file extraction may monitor the file name and storage path of a file that is stored in the Android container 30 through the monitoring unit 110.

When a file extension stored in the Android container 30 is identified to be a critical extension (510), the apparatus 100 of dynamic loading file extraction may extract the file with the critical extension (520). The apparatus 100 of dynamic loading file extraction may conduct first analysis through the first extracting unit 120 to identify if a file extension stored in the Android container 30 corresponds to one of preset critical extensions DEX, jar, zip, APK and SO, and extract the file with the preset critical extension as a dynamic generated file.

The apparatus 100 of dynamic loading file extraction may identify if there is a deleted file standing for a file deleted after stored in the Android container 30 (530). The apparatus 100 of dynamic loading file extraction may identify if there is a file deleted after stored in the Android container 30 through the memory log provided in the Linux host 20.

When it is identified that there is a deleted file standing for a file deleted after stored in the Android container 30 (530), the apparatus 100 of dynamic loading file extraction may identify the file name and storage path of the deleted file (540). The apparatus 100 of dynamic loading file extraction may conduct second analysis through the second extracting unit 130 to identify the file name and storage path of a deleted file standing for a file deleted after stored in the Android container 30.

The apparatus 100 of dynamic loading file extraction may run the application on the Android container 30 again (550), and monitor the Android container 30 (560).

When a deleted file is stored in the storage path identified through the second analysis (570), the apparatus 100 of dynamic loading file extraction may extract the deleted file (580).

The apparatus 100 of dynamic loading file extraction may store the extracted file in a separate storage path (590). The apparatus 100 of dynamic loading file extraction may store the file with critical extension or the deleted file in a separate storage path, for example, the SD card area of the Linux host 20.

The method for extracting a specific dynamic generated file as described above may be implemented in the form of program commands that are executed through various computer components and may be recorded in non-transitory computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, such as magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the operation according to the present disclosure, or vice versa.

While the embodiments of the present disclosure have been hereinabove described with reference to the accompanying drawings, it will be appreciated by those having ordinary skill in the technical field pertaining to the present disclosure that the present disclosure may be embodied in other specific forms without changing the technical spirit or essential features of the present disclosure. Therefore, it should be understood that the embodiments described above are for illustration purposes only in all aspects, but not intended to be limiting.

DETAILED DESCRIPTION OF MAIN ELEMENTS

1000: Application analysis system
10: Server
20: Linux host
30: Android container
100: Apparatus of dynamic loading file extraction

What is claimed is:

1. A method of dynamic loading file extraction for an application running in an Android container, the method comprising:
conducting a first analysis to determine whether a file has a file extension and is stored in the Android container and the file extension of the file corresponds to any of a predetermined group of file extensions and to extract the file having the file extension which corresponds to any of the predetermined group of file extensions;
conducting a second analysis to identify a deleted file which is stored in the Android container and deleted; and
re-executing the application and extracting the deleted file based on a result of the second analysis.

2. The method of dynamic loading file extraction according to claim 1, further comprising:
monitoring the Android container to identify a file name and a storage path of any file that is stored in the Android container when the application runs.

3. The method of dynamic loading file extraction according to claim 1, further comprising:
storing the extracted file in a separate path.

4. The method of dynamic loading file extraction according to claim 1, wherein the predetermined group of file extensions includes DEX, jar, zip, APK and SO.

5. The method of dynamic loading file extraction according to claim 1, wherein the second analysis comprising identifying if a deletion log is present in a memory log provided in a Linux host on which the Android container runs, and when there is the deletion log, identifying a file name and a storage path of the deleted file from the deletion log.

6. The method of dynamic loading file extraction according to claim 1, wherein the step of rerunning the application and the step of extracting the deleted file comprise re-executing the application and extracting the deleted file when the deleted file is present as a result of the second analysis.

7. The method of dynamic loading file extraction according to claim 6, wherein the step of the reexecuting the application and the step of the extracting the deleted file further comprise terminating file extraction when the deleted file is absent as a result of the second analysis.

8. The method of dynamic loading file extraction according to claim 1, wherein further comprising, identifying a file name and a storage path of the deleted file by conducting the second analysis, and, while the application re-executes, extracting the deleted file at the moment when the deleted file is being stored in the storage path of the deleted file.

9. An apparatus of dynamic loading file extraction for an application running in an Android container, the apparatus comprising:
a processor and a memory;
a first extracting unit conducting a first analysis to determine whether a file has a file extension and is stored in the Android container and the file extension of the file corresponds to a predetermined group of file extensions and to extract the file having the file extension which corresponds to any of the predetermined group of file extensions; and
a second extracting unit conducting a second analysis to identify a deleted file which is stored in the Android container and deleted, to re-execute the application and to extract the deleted file based on a result of the second analysis.

10. The apparatus of dynamic loading file extraction according to claim 9, further comprising:

a monitoring unit monitoring the Android container to identify a file name and a storage path of any file that is stored in the Android container when the application runs.

11. The apparatus of dynamic loading file extraction according to claim 9, further comprising:
a file storing unit storing the file extracted by the first extracting unit and the second extracting unit in a separate path.

12. The apparatus of dynamic loading file extraction according to claim 9, wherein of the predetermined group of file extensions includes DEX, jar, zip, APK and SO.

13. The apparatus of dynamic loading file extraction according to claim 9, wherein the second extracting unit identifying if a deletion log is present in a memory log provided in a Linux host on which the Android container runs, and when there is the deletion log, and identifying a file name and a storage path of the deleted from the deletion log.

14. The apparatus of dynamic loading file extraction according to claim 9, wherein the second extracting unit re-executes the application and extracts the deleted file when the deleted file is present as a result of the second analysis, and terminates file extraction when the deleted file is absent as a result of the second analysis.

15. The apparatus of dynamic loading file extraction according to claim 9, wherein the second extracting unit identifies a file name and a storage path of the deleted file by conducting the second analysis, and while the application re-executes, extracts the deleted file at the moment when the deleted file is being stored in the storage path of the deleted file.

* * * * *